Sept. 9, 1958  M. E. SNODDY  2,851,099
AUTOMATIC CONTROL FOR SPRINKLER SYSTEMS
Filed March 2, 1953  5 Sheets-Sheet 4
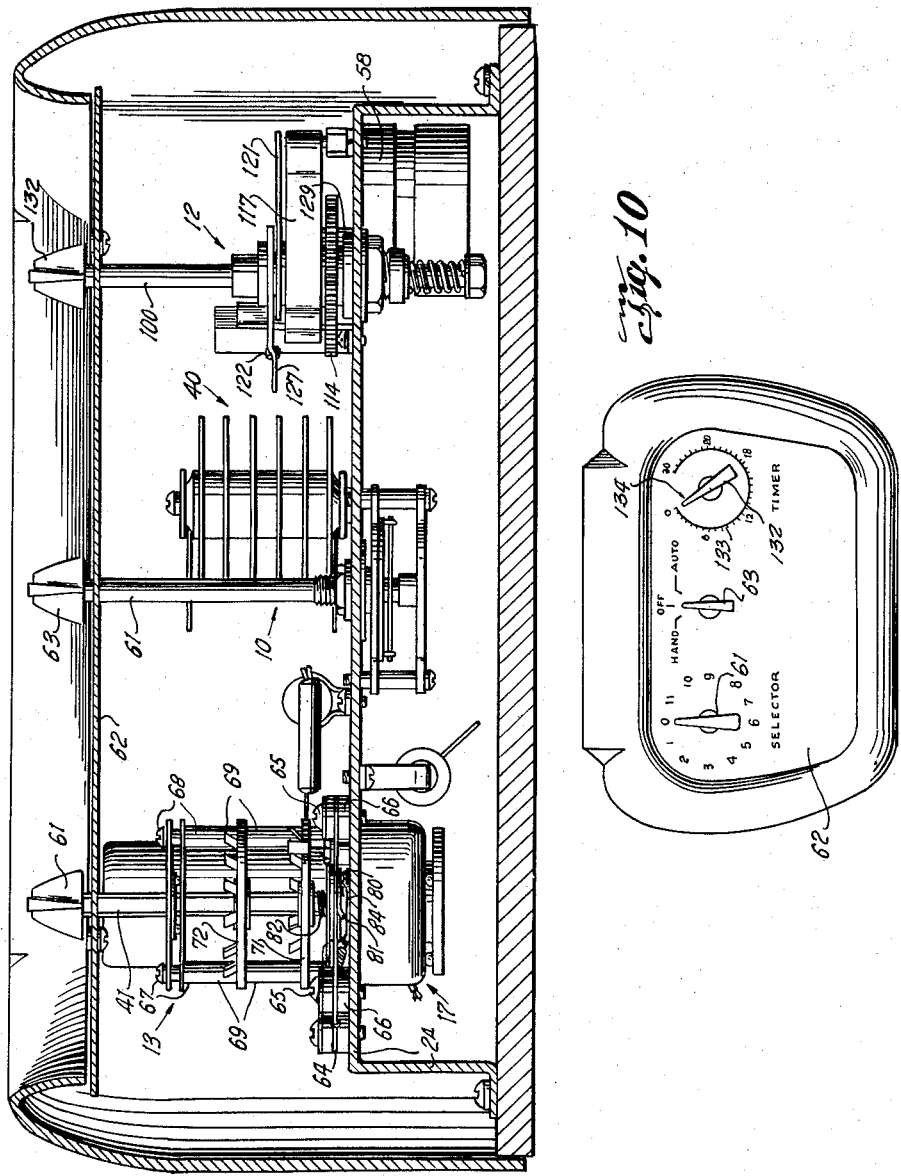
Max E. Snoddy
INVENTOR.
ATTORNEY Sept. 9, 1958 M. E. SNODDY 2,851,099
AUTOMATIC CONTROL FOR SPRINKLER SYSTEMS
Filed March 2, 1953 5 Sheets-Sheet 5
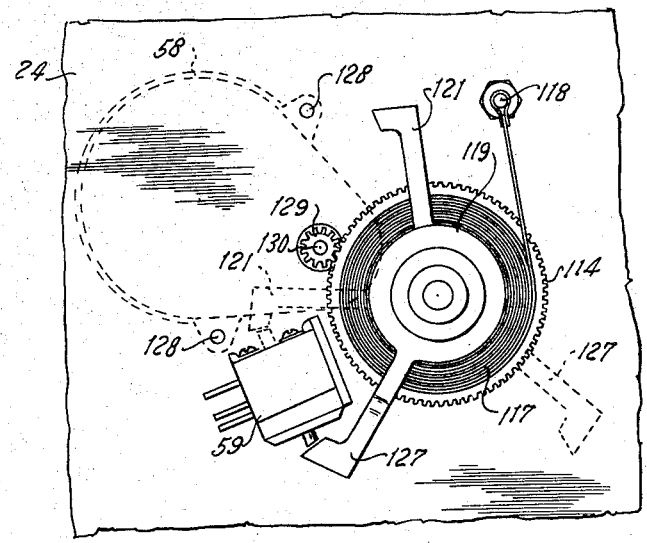
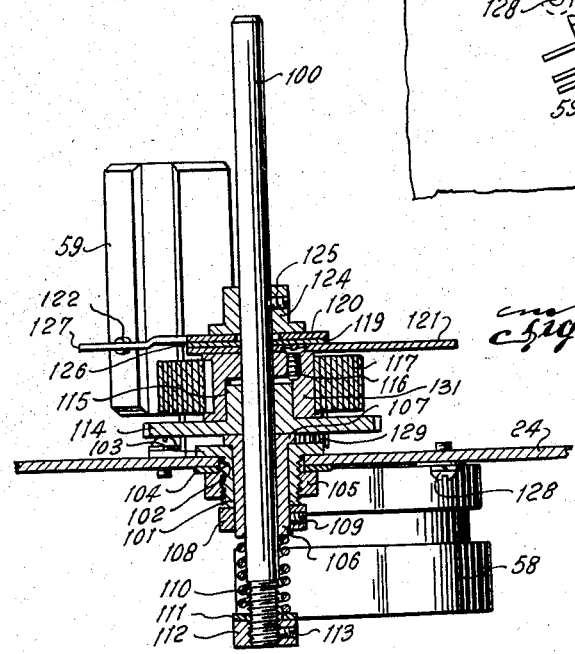
MAX E. SNODDY
INVENTOR.
ATTORNEY

United States Patent Office 2,851,099
Patented Sept. 9, 1958

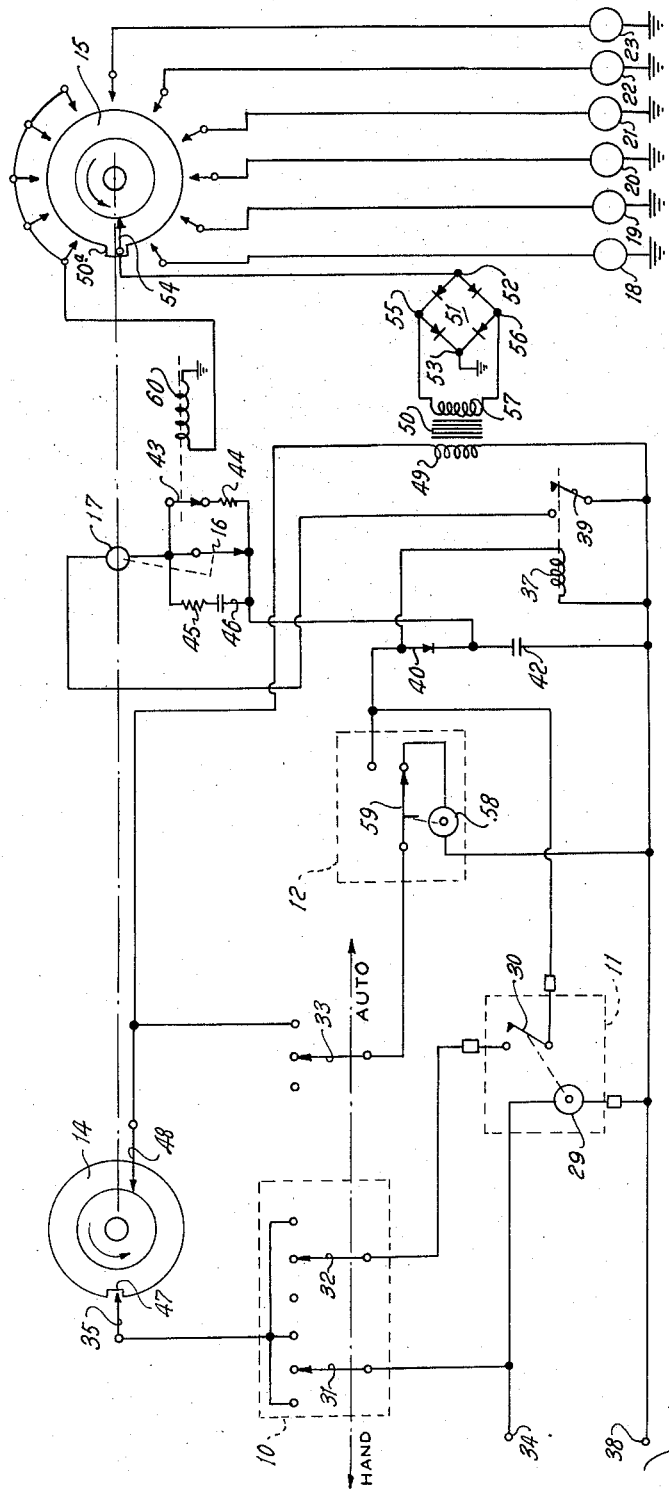

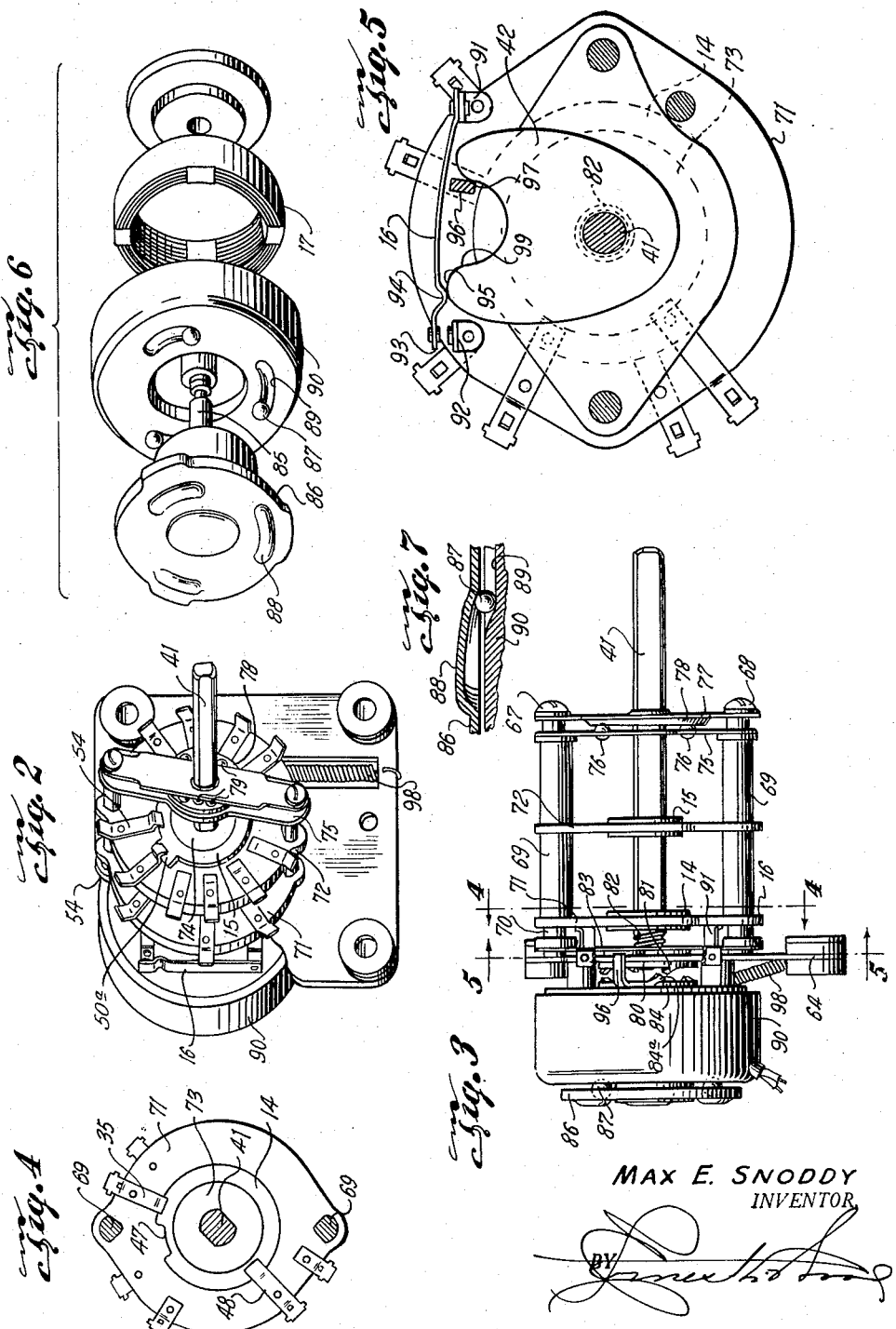

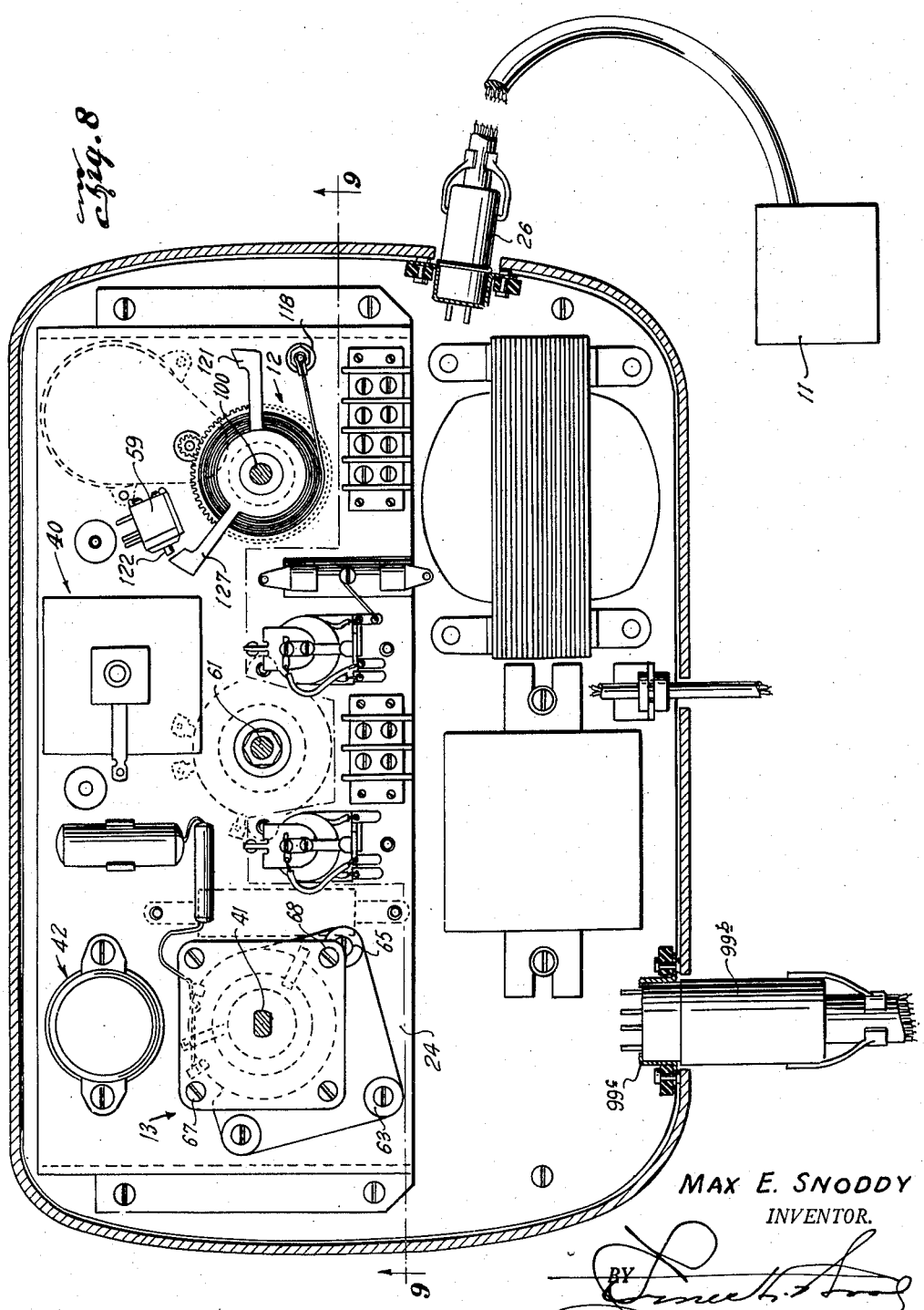

2,851,099

AUTOMATIC CONTROL FOR SPRINKLER SYSTEMS

Max E. Snoddy, Dallas, Tex.

Application March 2, 1953, Serial No. 339,549

1 Claim. (Cl. 161—1)

This invention relates to a control system for automatic lawn sprinklers or the like.

This application is a continuation in part of my copending application, Serial No. 75,003, filed February 7, 1949, now abandoned.

Automatic lawn sprinkling systems often employ solenoid controlled spray nozzles which are connected to water supply pipes buried in the ground beneath a lawn. It is desirable that an automatic control system be provided for such sprinkler systems which will selectively permit either fully automatic, semi-automatic or manual operation of the solenoid controlled spray nozzles for selectively opening selected spray nozzles of the sprinkling system whereby selected areas of the lawn may be watered.

It is an object of the invention to provide a new and improved control system for sprinkler systems which permits different sections of the sprinkler system to be selectively and individually placed in operation since inadequacies of the water supply usually prevent simultaneous operation of all sections of the sprinkling system.

It is another object of the invention to provide a control system of the type described which prevents more than one section of the sprinkling system to be operated at one time to prevent a drop in the water supply pressure which would occur if two or more sections were operated simultaneously and which would cause the water spray of each nozzle to cover a lesser area thus allowing intervening areas of lawn between adjacent spray nozzles to remain unwatered.

It is still another object of the invention to provide a control system of the type described having automatic means for progressively placing the sections of the sprinkling system in operation for predetermined successive periods of time.

A further object of the invention is to provide a control system of the type described which automatically operates at a selected time of the day to progressively place the sections of the sprinkling system in operation for predetermined successive periods of time.

A still further object of the invention is to provide a control system of the type described having switch means for selectively placing the sytem for automatic operation wherein the control system automatically initiates operation of the sprinkling system at a predetermined time of the day and successively and progressively places the various sections of the sprinkling system in operation for successive predetermined periods of time; for selectively placing the system for semi-automatic operation wherein the control system may be manually placed in operation at any time of the day for progressively placing the varicus sections of the sprinkling system in operation for successive predetermined periods of time; and for selectively placing the system for manual operation wherein any section of the sprinkling system may be set in operation for any desired period of time.

It is another object of the invention to provide a new and improved timing means.

It is still another object of the invention to provide a new and improved timer for actuating a switch after a predetermined time interval.

It is a further object of the invention to provide, in a timer of the type described, means for easily selecting and varying the duration of the time interval.

With the foregoing objects in view, the invention has further reference to certain features of accomplishment which will become apparent as the description proceeds, taken in connection with the accompanying drawings wherein:

Figure 1 is a diagrammatic illustration of the control system;

Figure 2 is a perspective view of a rotary switching mechanism forming an element of the control system;

Figure 3 is a side elevation of the rotary switching mechanism;

Figure 4 is a sectional view taken on the line 4—4 of Figure 3;

Figure 5 is a sectional view taken on the line 5—5 of Figure 3;

Figure 6 is an exploded view of the solenoid of the rotary switching mechanism;

Figure 7 is a fragmentary sectional view showing the mechanism for converting the longitudinal force of the solenoid to rotary movement.

Figure 8 is a sectional view of the control system mounted in a housing;

Figure 9 is a sectional view taken on the line 9—9 of Figure 8;

Figure 10 is a reduced front plan view of the housing;

Figure 11 is a top plan view of the timer; and

Figure 12 is a vertical sectional view of the timer.

Referring now particularly to Figure 1 of the drawing, the control system for sprinkling systems comprises a three pole, triple throw switch 10 for selectively placing the control system for automatic operation, for manual operation, or for preventing any operation of the control system; a clock attachment 11 for initiating automatic operation of the control system at any predetermined time of the day; a timer 12 for predetermining the periods or intervals of time each section of the sprinkling system is in operation; and a rotary selector switch mechanism 13, Figure 9, which includes the slip control rings 14 and 15 and a switch 16, driven by a solenoid 17 for selecting the sections of the sprinkling system controlled by the solenoid valves 18 through 23. The solenoids of these valves are selectively energized to open the valves as desired in a manner which will become apparent as the description progresses.

The three pole, triple throw master switch 10, which may be any conventional switch, such as the rotary switch shown in Figures 8 and 9, the timer 12 and the rotary selector switch mechanism 13 are mounted on a base plate 24 of a housing 25. The clock attachment 11 may be of the kind described in my copending application, Serial No. 269,079, filed January 30, 1952, now Patent No. 2,657,748, and is connected to the control system through a plug 26 connection, Figure 8, the socket of which is secured to the base plate of a housing.

The clock attachment 11 includes an electrically operated clock or motor 29 which momentarily closes a switch at a predetermined time of the day. A detailed description of the manner in which the switch 30 is momentarily closed by the clock mechanism may be found in my copending application.

The master switch 10 is provided with three contacts 31, 32 and 33 which are shown in Figure 1 in the "off" position wherein the control system is inoperative. The contact 31 is connected to one side 34 of an alternating current supply circuit and is adapted to connect the contact 35 to the side 34 of the alternating current supply circuit when the master switch is moved either to the left for hand operation or to the right for automatic operation.

The contact 32 is adapted to connect a relay winding 37 across the terminals 34 and 38 of the supply circuit through the switch 30 of the clock attachment 11 but only when the master switch has been moved to the right to "automatic" position. The relay winding 37, when energized by the alternating current from the supply circuit, closes the normally open contact 39. The contact 39 connects the solenoid 17 across the terminals 34 and 38 of the alternating current supply circuit when the master switch is in automatic position through the normally closed switch 16, a rectifier 40, which may be of the selenium disk type, the contact 30 of the clock attachment 11, and the contacts 32 and 31 of the master switch. The solenoid 17 is thus energized with direct current to rotate through a predetermined angle a ratcheted shaft 41 (Figure 4) on which the slip rings 14 and 15 are mounted. The manner in which the solenoid 17 rotates the shaft 41 will be described below. A condenser 42 is connected across the solenoid 17 through the contact 39 and switch 16 to smooth the pulsating direct current flowing through the solenoid since the rectifier 40 is a half wave rectifier.

When the shaft 41 is rotated through the predetermined angle, the switch 16 is opened by a cam member 42 (Figure 5) so that the solenoid 17 is now connected to the rectifier 40 through the relay contact 43 and a current limiting resistance 44. The solenoid 17 requires a large amount of current upon initial energization since the inertia and friction of various operating elements must be overcome but thereafter a lesser amount of current is needed to continue rotation of the shaft 41 and to hold it in rotated position. For this reason, the normally closed switch 16 is opened after rotation of the shaft 41 is commenced so that the amount of direct current flowing to the solenoid 17 is reduced by the resistance 44. The resistance 45 and condenser 46 are connected in series across the switch 16 to prevent sparking at the switch 16 when the switch 16 is opened.

The rotation of the shaft 41 causes the slip rings 14 and 15, which are mounted on the shaft, to rotate with the shaft through a predetermined angle, for example, 30 degrees. When the rings are moved 30 degrees in the directions indicated by the arrows, the slot or recess 47 of the ring 14 is moved past the contact 35 so that alternating current may flow from the contact 35 through the ring 14 and the contact 48, which is always in contact with the ring 14, to the primary winding 49 of a transformer 50, the primary winding 49 thus being connected across the terminals 34 and 38 of the alternating current supply circuit through the contacts 35 and 48, the ring 14 and the contact 31 of the master switch 10.

At the same time, the outwardly extending projection or extension 50a of the ring 15 is moved to contact a stationary contact 1 so that the solenoid of the solenoid valve 18 is supplied with direct current from a rectifier 51, the solenoid of the valve 18 now being connected across the output terminals or points 52 and 53 of the rectifier 51 through a stationary contact 54, Figure 1 and Figure 2, which is always in contact with the ring 15, the stationary contact 1 and ground. The input terminals 55 and 56 of the rectifier are connected to opposite sides of the secondary winding 57 of the transformer 50.

The contacts 35 and 48, the ring 14 and the contacts 31 and 33 of the master switch now also connect the motor 58 of the timer across the terminals 34 and 38 of the supply circuit so that the motor 58 commences to run.

This sequence of operations occurs while the clock switch 30 is momentarily closed. When the switch 30 moves back to open position, the relay winding 37 is de-energized and the relay contact 39 moves to open posi-tion so that the selector switch solenoid is also de-energized and the switch 16 moves back to closed position.

The primary transformer winding 49 will continue to be connected across the supply circuit. The solenoid of the valve 18 will remain energized until the timer motor 58 has operated for a preset predetermined period of time. When the predetermined period of time elapses, the switch contact 59 is moved momentarily to disconnect the timer motor 58 from the supply circuit and to re-connect the relay winding 37 across the supply circuit through the master switch contact 33, the selector switch contacts 48 and 35, the ring 14 and the master switch contact 31. The solenoid will then again be connected across the supply circuit by the relay contact 39 and will rotate the shaft 41 another 30 degrees in the direction indicated by the arrows. The extension 50a of the ring 15 will now be moved to a position wherein it contacts the stationary contact 2 and thus the solenoid of the valve 18 is deenergized and the valve 18 is closed while the solenoid of the valve 19 is energized and opens the valve 19. Now the section of the sprinkling system controlled by the valve 19 will be in operation.

The timer switch 59 remains in the actuated position for a short period of time and then moves back to its original position disconnecting the relay winding 37 from the supply circuit and reconnecting the timer motor 58 across the supply circuit. The selector switch solenoid is thus again de-energized and remains de-energized until the timer motor 58 again moves the switch 59 to its actuated position after another predetermined period of time.

This cycle of operations continues to advance the rings 14 and 15 in step by step fashion to cause the solenoid valves 20 to 23 to be successively and automatically opened for predetermined periods of time. In this way, the several sections of the sprinkling system controlled by the solenoid valves will be successively placed in operation for successive predetermined periods of time. It will be noted that the ring 14 and its contact and the ring 15 and its contact in effect constitute two rotary switches simultaneously operated by the shaft 41.

As many solenoid valves may be controlled by the selector switch as there are stationary contacts arranged around the ring 15. The selector switch is provided with 11 such contacts but if the sprinkling system comprises fewer valves, say six sections, the remaining contacts 7 to 11 are connected together and to a relay winding 60 so that the shaft 41 may be rotated quickly back to its original inoperative position after the six sections of the sprinkling systems were placed in operation. Assuming now that the selector switch shaft 41 has been rotated to the position wherein the extension 50a of the ring 15 contacts the stationary contact 7. The timer switch is still in its actuated position and will remain in the actuated position for a short period of time. The relay winding 60 is then energized with direct current from the rectifier 51 and the contact 43 is opened. Since the switch 16 is now also open, the selector switch solenoid is de-energized. When it is de-energized the switch 16 closes and the selector switch solenoid is again energized to again rotate the selector switch shaft 30 degrees to open the switch 16 and move the ring 15 to a position wherein its extension 50a contacts the stationary contact 8 whereupon the relay winding 60 is again energized, the contact 43 is again opened and the solenoid again de-energized. This sequence repeats itself in rapid fire order until the selector switch shaft 41 is progressively rotated back to its original position shown in Figure 1. The timer switch 59 remains in the actuated position for a period of time sufficient to permit the shaft to be rotated through 360 degrees when any number of stationary contacts 1 to 11 are connected to one another.

When the selector switch shaft 41 is rotated through a full 360 degrees, the rings 14 and 15 are back in the positions shown in Figure 1 and the device is inoperative since the contact 35 is now in the recess 47 of the ring 14 and does not contact the ring 14 and the extension 50 of the ring 15 does not contact any of the stationary contacts 1 to 11. The relay contact 39 prevents any discharge of condenser 42, when the contact 35 is in the recess 47, through the solenoid 17 at the end of a cycle of operation. Such a discharge could energize the solenoid and initiate another cycle of operation. The relay contact 39 disconnects the solenoid 17 from the line 38 and this prevents such undesirable energization of the solenoid.

The control device will then remain inoperative until the clock mechanism or attachment 11 again closes the switch 30 when the entire cycle is repeated. The clock mechanism 11 may be preset to initiate this cycle of operations each day at a certain time so that the lawn may be sprinkled each day. If desired, the clock attachment may close the switch 30 every two days or at any other desired intervals of time.

If semi-automatic operation of the sprinkling system is desired, the master switch is left in the automatic position. The selector switch shaft 41 is then rotated manually through 30 degrees by means of the control knob 61 (Figure 10) secured to its outer end so that the extension 50a of the ring 15 now engages the stationary contact 1.

The solenoid valve 18 will now be opened and the control system will operate in the above described manner just as though the cycle had been initiated by clock switch 30, rotating selector switch shaft 41 at predetermined intervals to successively energize the solenoids of the valves for predetermined periods of time until the shaft 41 rotates back to its original position. The control system will then hold the sprinkling system inoperative until the selector switch shaft 41 is again rotated manually or until the clock switch 30 is closed automatically.

If it becomes desirable to water particular sections of a lawn and skip other sections because the particular sections were fertilized, or new shrubs were set out in the particular sections or for any other reason, the master switch is moved to the extreme left portion, Figure 1, so that only the contact 31 is connected to the contact 35.

The clock attachment or mechanism 11 and the timer 12 will now be inoperative and the selector switch solenoid 17 cannot be energized. The selector switch shaft is then rotated to cause the extension 50a of the ring 15 to contact the particular stationary contact associated with the particular section it is desired to water. For example, if it is desired to operate the section of the sprinkling system controlled by the solenoid valve 19, the selector switch shaft 41 is rotated 60 degrees. To prevent unnecessary energization of the other valves, the master switch may be left in off position until the selector switch shaft 41 is rotated to select the proper solenoid valve which must be energized in order that a particular section of the lawn may be watered. The solenoid of the selected valve will then be energized when the master switch is moved to the "hand" position.

The master switch 10, Figure 9, may be of the rotary type and have a shaft 61 rotatably secured to base plate and having a forward end extending through the front plate 62 of the housing 25. A control knob 63 may be attached to the forward end of the master switch shaft so that the switch may be moved as desired to any of the three positions shown in Figure 10.

The selector switch 13, Figure 9, includes a main plate 64 which is secured to the base plate 24 of the housing by means of screws 65. Washers 66 space the main plate from the base plate. A pair of long screws 67 and 68 extend through suitable spacer sleeves 69 into threaded bosses 70, Figure 3, rigidly secured to the main plate. The spacer sleeves hold a pair of supporting insulator plates 71 and 72 in spaced relation on the screws 67 and 68. The insulator plates 71 and 72 have central apertures in which are disposed insulating disks 73, Figure 4, and 74, Figure 2, respectively, on which are mounted the contact rings 14 and 15, respectively. The contacts 35 and 48, Figure 4, are mounted on the insulator plate 71 while the stationary contacts 1 to 11 and the contact 54 are mounted on the insulator plate 72, Figure 2.

The insulating disks 73 and 74 are mounted on the selector switch shaft 41 which has a pair of parallel flat sides and which passes through central apertures in the disks which are of corresponding configuration so that the disks rotate with the selector switch shaft.

A leaf spring 75, Figure 3, mounted on the lug screws 67 and 68 has a pair of apertures in which are disposed a pair of ball bearings 76, the apertures being of smaller diameter than the ball bearings. An end supporter plate 77 is also mounted on the lug screws, spaced from the leaf spring, to hold an indexing disk 78 against outward movement on the selector switch shaft 41. The indexing disk 78 rotates with the shaft and is provided with a plurality of indexing holes 79, Figure 2, in which the ball bearings may partially enter, the indexing holes also being of smaller diameter than the ball bearings. The indexing holes are so spaced that the shaft 41 is held in any one of several positions, each of such positions corresponding to one of the stationary contacts 1 to 11. The leaf spring 75 yields when the shaft is rotated so that as the indexing disk is rotated with the shaft, the ball bearings first move away from the indexing disk as they leave one pair of indexing apertures 79 and then move toward the indexing disk as they enter the next pair of indexing apertures. It will be apparent that the ball bearing and index disk serve to provide positive indexing of the shaft 41 so that it rotates exactly 30 degrees each time the solenoid 17 is energized and that they serve to lock the shaft 41 in any of its several positions when the solenoid is de-energized.

The extreme inner end of the shaft 41 is provided with a ratchet member 80, Figure 3, which is rigid with the shaft and is provided with a plurality of outwardly displaced teeth 81. The ratchet member 80 abuts supporting plate 64, thus limiting outward movement of the shaft 41. The shaft 41 is biased outwardly by a spring 82 disposed on the shaft which bears against a cam retainer plate 83 which holds a cam member 42, Figure 5, in position on the shaft 41. The cam retainer plate is supported on the bosses 70 of the supporting plate.

The teeth 81 of the ratchet member are adapted to be engaged by the teeth 84a of a corresponding ratchet member 84 secured to the steel core 85 of the solenoid 17. The core 85 is secured to an armature plate 86 whose rotation is restricted to 30 degrees each time the solenoid is energized by ball bearings 87, Figures 6 and 7, which are disposed in corresponding inclined races 88 and 89 in the armature plate 86 and the housing 90 of the solenoid. The ball bearings 87 and the races convert the longitudinal thrust of the core into limited rotary movement each time the solenoid 17 is energized.

The teeth 84a of the ratchet member 84 are so disposed that each time the solenoid 17 is energized, a tooth 84a engages a tooth 81 of the ratchet member 80 as the ratchet member 84 moves toward the ratchet member 80 and at the same time rotates through 30 degrees. This engagement of the teeth causes the shaft 41 to be rotated through 30 degrees each time the solenoid is energized. The ball bearings 76 and the indexing ring 78 insure that the shaft 41 is rotated exactly 30 degrees each time the solenoid is energized.

The switch 16, Figure 5, is mounted on the insulator plate 71 by means of a bracket 91. A second bracket 92 on the insulator plate 71 supports the contact 93. The switch 16 is formed of a resilient metal strip of spring and is bent adjacent its free end to form a cam portion 94 which is adapted to be engaged by the cam portion 95 of the cam member 42 to open the switch 16 when the cam member is moved by the lug 96 on the ratchet member 84. The lug 96 contacts the cam member at 97 when the solenoid is energized and the ratchet member 84 is rotated, to move the cam member and open the switch. When the solenoid is de-energized, the restoring spring 98, whose opposite ends are secured to the supporting plate 64 and the ratchet member 84, causes the ratchet member and the core 85 to rotate in the opposite direction, and the lug 96 contacts the cam member at 99 to move it back to its original position so that switch 16 again closes.

It will be seen now that the solenoid 17 rotates the selector switch shaft 41 30 degrees, and that the switch 16 is opened by the cam member 42, each time the solenoid is energized. It will also be seen that the restoring spring 98 serves to move the core 85 of the armature back to its original position each time the solenoid is de-energized.

When the solenoid 17 is not energized, the shaft 41 is free to be rotated manually in either direction by the knob 61, Figures 9 and 10, since the teeth of the ratchet members cannot engage unless the ratchet member 84 is moved toward the ratchet member 80, a situation which occurs only when the solenoid is energized.

The solenoids of the solenoid valves 18 to 23 are connected to the control system by means of a plug 99b, Figure 8, which connects in a socket 99c mounted on the housing 25 so that the control can be easily attached to any sprinkler system.

The timer 12, Figures 11 and 12, includes a main shaft 100 which is rotatably mounted on the base plate 24 by means of a threaded adaptor 101 which extends through a suitable aperture 102 in the base plate. The adaptor 101 has an annular flange 103 which abuts one side of the base plate 24 and a washer 104 on the adaptor 101 abuts the other side of the base plate and is held firmly in engagement therewith by a nut 105 threaded on the adaptor. A bushing 106 is movably mounted in the bore of the adaptor 101 and has a flange 107 which limits longitudinal movement of the bushing through the adaptor in one direction and a collar 108, secured to the bushing by a set screw 109, which limits longitudinal movement of the bushing in the opposite direction.

The main shaft 100 of the timer is slidably and rotatably disposed in the bushing 106 and is biased downwardly by a spring 110 disposed on the inner end of the shaft adjacent the bushing 106. One end of the spring 110 bears against the bushing and the other against a washer 111 held on the shaft by a nut 112 threaded on the inner end of the shaft and held in place by a set screw 113. The compression of the spring 110 may be adjusted by rotating the nut 112.

Rotatably mounted on the main shaft 100 is a gear 114 on whose hub 115 is rigidly mounted a drum 116. The drum may be rigidly mounted on the hub by a press fit or in any other suitable manner. A main spring 117 is wound on the drum 131 and its inner end is rigidly secured to the drum in any suitable manner, as by insertion in a milled slot in the drum. The outer end of the spring is secured to a post 118 mounted on the base plate 24.

A circular plate 119 rotatably mounted on the main shaft 100 is rigidly secured to the drum by means of screws 116 to rotate with the drum. The circular plate 119 is provided with an arm 121 which extends outwardly so that it may contact the outward end of the pin plunger 122 of the micro-switch 59 and move it inwardly, Figure 11, when the drum 131 is rotated counter-clockwise by the stored energy of the spring 117.

A second circular plate 120 is rigidly mounted on the main shaft 100 by means of an adapter 124 to which it is secured by soldering or in any other suitable manner. The adaptor 124 is slidable longitudinally on the main shaft and is rigidly secured thereto by a set screw 125. A friction washer 126 is interposed between the two circular plates 120 and 119 so that the two plates normally rotate together, the spring 110 normally exerting sufficient force to prevent any slippage between the friction washer 126 and the circular plates 120 and 119.

The circular plate 120 is provided with an arm 127 which extends outwardly so that it may move to contact the lower end of the pin plunger 122 and move it upwardly as the drum 131 is rotated clockwise by the synchronous motor 58, which is mounted on the base plate 24 by screws 128, by means of a gear 129 on its driving shaft 130 which meshes with the gear 114.

The outer end of the main shaft 100 extends through the front panel 62 of the housing 25 and is provided with a knob 132, Figure 9. The front panel has indicia 133, Figure 10, by means of which the time interval or period that each section of the sprinkling system is to be in operation may be preset. Also, the pointer end 134 of the knob 132 serves to show the remaining time before the next action of the selector switch mechanism 13 when a certain section of the sprinkling system is in operation.

In use, the knob 132 is rotated until its pointer end 134 is aligned with the desired time interval, say 20 minutes. This rotation of the knob 132 causes the main shaft and the arm 127, which is rigid with the shaft, to rotate also against the relatively small frictional force exerted by the friction washer. The arm 127 will then be spaced a predetermined distance from the trip 122 and the arm 121, which is held stationary by the spring 117; the two arms then being in the broken line position shown in Figure 11.

When the synchronous motor 58 is connected to a source of alternating current, as by the switch 59, master switch contact 33, the contacts 48, ring 14, contact 35 and contact 31 when the master switch is in the automatic position, the motor will drive the gears 130 and 114 causing drum 131 to rotate against the force of the spring 117 which is slowly wound on the drum as the motor continues to operate. As the drum rotates, the circular plates 120 and 119 also rotate, the plate 120 being held rigid with the plate 119 by the friction between the circular plates and the friction washer 126. As a result, the main shaft 100 also rotates, in a clockwise direction (Figure 11). The arms 121 and 127 rotate clockwise from their broken line positions until at the end of twenty minutes, they reach the solid line positions shown in Figure 11. Further clockwise movement of the arm 127 will now cause the arm 127 to move the pin plunger 122 of the micro-switch inwardly to actuate the micro-switch which then disconnects the motor 58 from the alternating current supply circuit. The energy stored in the spring 117 now causes the shaft 100 and the arms 121 and 127 to rotate in a counter-clockwise direction until the arm 121 contacts the outer end of the pin plunger 122, which now protrudes upwardly from the micro-switch, and moves the pin plunger downwardly to again connect the motor 58 to the source of alternating current. This cycle is repeated each time the motor is connected to a source of current. The setting of the arm 127 relative to the arm 121 during this cycle is not changed since the force needed to operate the trip 122 in either direction is very small and not as great as that necessary to overcome the friction between the two circular plates and the friction washer.

It will now be seen that a new and improved timer 12 has been provided in which a synchronous motor 58 is employed to drive a shaft 100 in one direction against the force of a biasing spring 117 and that the motor is connected to the shaft by means of a frictional coupling or transmission which includes the circular plates 119 and 120 and the friction washer 126 so that the relative positions of the arms 121 and 127 may be adjusted. It will also be seen that the micro-switch 59 connects the synchronous motor 58 to the source of current until the arm 127 actuates the trip 122 in one direction and that the synchronous motor remains inoperative during a predetermined period of time while the spring 117 rotates the arm 121 to the position wherein it actuates the trip 122 in the opposite direction to again connect the motor to the source of current. Moreover, it will be seen that the motor may be preset to operate for any selected period of time by rotating the knob 132 and thus the main shaft 100 to space the arm 127 predetermined distances from the trip 122.

It will be apparent now that a simple control system for sprinkling systems has been illustrated and described which may be operated by the three knobs 61, 63 and 132 on the front panel 62 of the housing 25. The operator will preset the time interval or period during which each section of the sprinkling system is to operate by rotating the knob 132 until the pointer end 134 points to the number of minutes of the desired time interval.

If the automatic operation is desired, the knob 63 of the master switch 10 is rotated to "auto" position and the control system will start the cycle of operation upon the closing of the switch 30 of the clock attachment 11. If semi-automatic operation is desired, the cycle of operation is started manually by rotating the knob 61 of the selector switch to position 1. Finally, if hand operation is desired, the knob 63 is rotated to "and" position to render the timer 12 and clock switch 30 ineffective, and the knob 61 is rotated to any desired position to place the corresponding section of the sprinkling system in operation which will remain in operation until the selector switch knob is rotated to "0" position or until the master switch knob 63 is rotated to "off" position.

Manifestly, the construction as shown and described is capable of some modification and such modification as may be construed to fall within the scope and meaning of the appended claim is also considered to be within the spirit and intent of the invention.

What is claimed is:

An electrical control system for successively supplying current to a plurality of electrically operated units comprising; an alternating current input circuit; a transformer having a primary winding and a secondary winding; a shaft; a solenoid for rotating said shaft in predetermined steps through 360 degrees; a first rotary switch operated by said shaft for connecting said primary winding across said input circuit when said shaft is rotated from an inoperative position; a rectifier connected across said secondary winding; a second rotary switch operated by said shaft for successively connecting said units across said rectifier as said shaft is rotated step by step; and a timer for connecting said solenoid across said input circuit through said first rotary switch at predetermined time intervals whereby said second rotary switch is advanced step by step at predetermined time intervals to successively connect said units across said rectifier, said first rotary switch stopping operation of said solenoid when all of said units have been successively connected across said rectifier and said shaft has been rotated through 360 degrees, said timer comprising a motor and a switch, said switch being operable by said motor to momentarily disconnect said motor from said input circuit each time the motor has run a predetermined period of time, and momentarily connect said solenoid across said input circuit.

References Cited in the file of this patent

UNITED STATES PATENTS

| | | |
|---|---|---|
| 1,836,797 | Harter | Dec. 15, 1931 |
| 1,984,688 | Murray | Dec. 18, 1934 |
| 2,000,367 | Williamson et al. | May 7, 1935 |
| 2,053,143 | Frederick | Sept. 1, 1936 |
| 2,163,419 | Warren | June 20, 1939 |
| 2,204,532 | Erguth et al. | June 11, 1940 |
| 2,254,795 | Daniels | Sept. 2, 1941 |
| 2,312,077 | Cowles | Feb. 23, 1943 |
| 2,359,160 | Sauter | Sept. 26, 1944 |
| 2,393,187 | Powell | Jan. 15, 1946 |
| 2,422,212 | Shann | June 17, 1947 |
| 2,449,178 | Sansbury | Sept. 14, 1948 |
| 2,652,197 | Berger | Sept. 15, 1953 |
| 2,756,818 | Borowski | July 31, 1956 |